July 17, 1962 E. KÖLLE 3,044,830
BACK REST ADJUSTING DEVICE
Filed Aug. 22, 1960 2 Sheets-Sheet 2
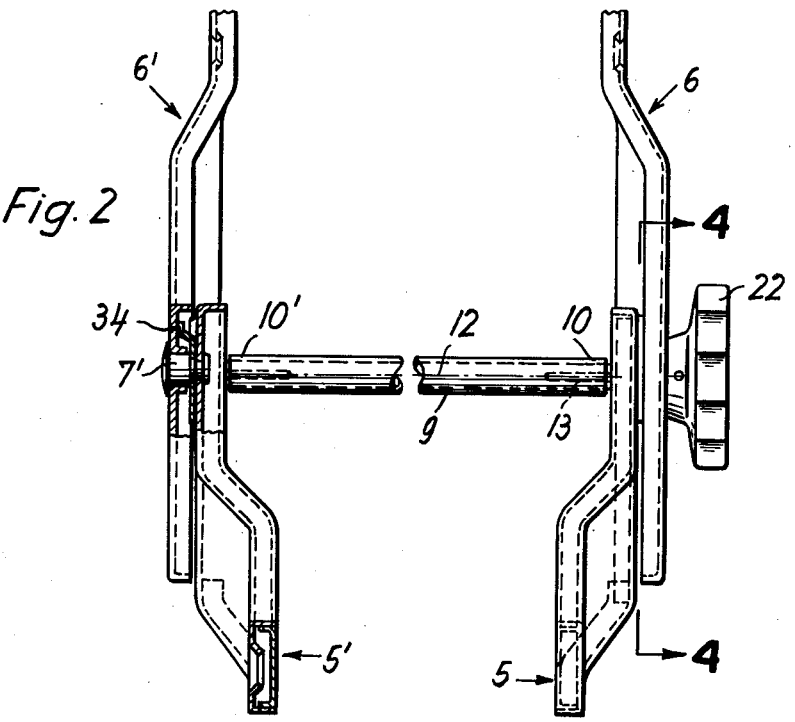
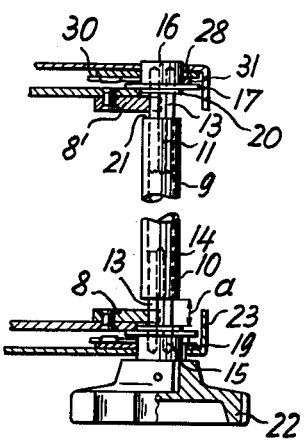
INVENTOR
ERWIN KÖLLE
ATTORNEYS

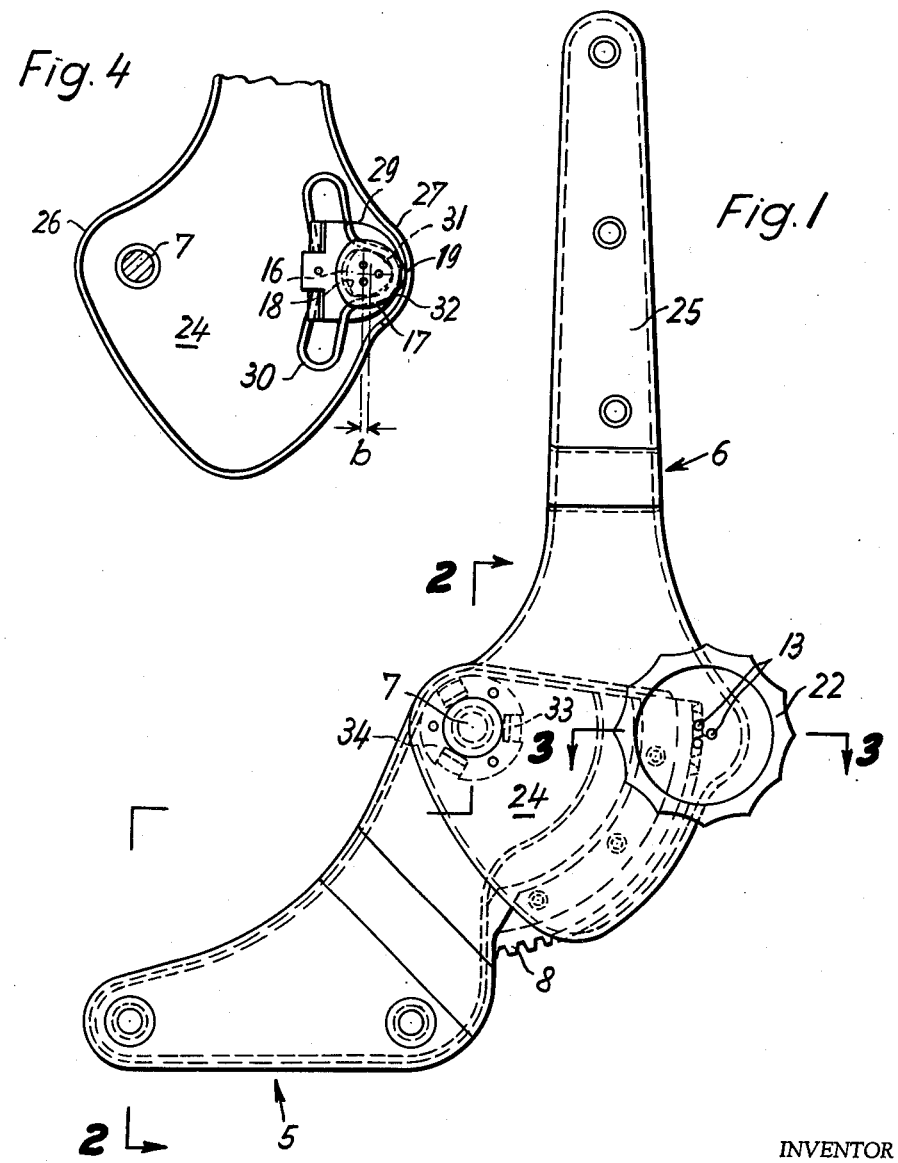

United States Patent Office 3,044,830
Patented July 17, 1962

3,044,830
BACK REST ADJUSTING DEVICE
Erwin Kölle, Sindelfingen, Kreis Boblingen, Germany, assignor to Daimler-Benz Aktiengesellschaft, Stuttgart-Unterturkheim, Germany
Filed Aug. 22, 1960, Ser. No. 51,079
Claims priority, application Germany Sept. 3, 1959
13 Claims. (Cl. 297—361)

The present invention relates to a device for adjusting the angular position of the back rest of a seat, especially of a motor vehicle, which comprises two pairs of hinge members which are secured to the seat and to the back rest, respectively, at the two sides thereof and one hinge member of each of which is provided with a gear segment, while a rotatable shaft connects the two pairs of hinge members for adjusting the same simultaneously.

It is an object of the present invention to provide a very simple and inexpensive device for quickly adjusting the back rest of a seat to any desired angle relative to the latter.

Most of the known adjusting devices of the back rests of seats are provided with hinge units, each of which has a gear rim with inner gear teeth and is constantly acted upon by one or more springs and held in the locked position by a pawl arrangement with corresponding teeth. In order to secure the back rest in the desired inclined position, these devices require an additional pawl lever which is mounted at one side of the seat separately from the pinion shaft of the gear and which must also be held under the tension of an additional spring. Such spring actuated gear and pawl structures are rather expensive and not very reliable in operation. Also they often require the operation of two control handles, knobs or the like.

According to the present invention, no spring-actuated pawl or the like is required for locking the gear of each hinge unit in the desired angular position of the back rest, but the knob-actuated control or drive shaft which connects the two hinge units at the opposite sides of a seat for simultaneous operation thereof is provided with driving pins which are secured to the shaft within the periphery thereof and are adapted to exert a self-locking action upon the gear rim or gear segment on each hinge unit.

Since the control shaft is provided with several driving pins which extend within the periphery of the shaft concentrically about the longitudinal axis thereof, and since the outer ends of these pins on each end of the shaft are connected to a cam member which is held under constant spring tension and one of which is connected to a manipulating device, for example, a control knob, the device according to the invention attains a very simple, easy, and very fine adjustability of the hinge units and of the back rest thereon and, due to the self-locking action of the device, it insures that the back rest will remain securely and automatically locked in any angular position. By providing each hinge unit with a gear segment with a large radius and outwardly directed gear teeth, it is also possible to attain a very accurate fine adjustment of the back rest and one which may be changed without effort by a rotation of the single control knob at one side of the seat. The back rest may in this manner be pivoted toward the rear to such an extent that together with the seat it may serve as a berth.

These and additional objects, features, and advantages of the present invention will become further apparent from the following detailed description thereof, particularly when the same is read with reference to the accompanying drawings, in which—

FIGURE 1 shows a side view of a pair of hinge members together with the device for adjusting a back rest;

FIGURE 2 shows a front view of the two pairs of hinge members of one set, partly in a cross section taken along line 2—2 of FIGURE 1;

FIGURE 3 shows a cross section taken along line 3—3 of FIGURE 1; while

FIGURE 4 shows a cross section taken along line 4—4 of FIGURE 2.

Since each set of hinge members according to the invention consists of two pairs of hinge members which are mounted on the opposite sides of a seat and are inversely equal to each other, it will only be necessary to describe and illustrate one pair of this set.

Hinge member 5 which is to be secured to one side of a seat and hinge member 6 which is to be secured to the same side of a back rest are pivotably connected to each other by a bearing member 7. A similar bearing member 7' pivotably connects hinge members 5' and 6' which are to be secured to the other side of the seat and back rest. Each hinge member 5 and 5' is provided on its one outer edge with an outwardly directed gear segment 8 and 8', respectively. The two hinge members 6 and 6' for the back rest are connected to each other by a tubular shaft 9. Into each end 10 and 10' of shaft 9 a plug member 11 is inserted and secured which supports three driving pins 13 which are equally spaced from each other and at equal distances from the center of plug member 11 and the axis 12 of shaft 9. The inner ends 14 of driving pins 13 are rigidly secured to the respective plug member 11. Shaft 9 may also consist of a solid rod, in which case the driving pins 13 may be inserted into suitable bores within each end of the shaft and be rigidly secured to the shaft.

The outwardly projecting ends 15 of driving pins 13 carry a cam member 16 with a plurality of cams 18 thereon, and a cam plate 17 with a corresponding number of cams 19 thereon. The number of cams on each cam member 16 and cam plate 17 is preferably equal to the number of driving pins 13 to which they are secured. As shown in FIGURE 3, cam plate 17 engages with cam member 16 and is pressed against the latter by a securing member 20.

It is possible either to fit cam plate 17 upon cam member 16, in which case cam plate 17 must have an aperture corresponding to the cross-sectional size and shape of cam member 16, and then to weld the two parts to each other, or cam member 16 and cam plate 17 may be made integrally of a single piece of material.

The securing member 20 and the end surfaces 21 of shaft 9 are spaced from each other at a distance $a$ which is slightly greater than the thickness of the teeth of gear segment 8 so that driving pins 13 can easily engage into gear segment 8 so as to rotate shaft 9.

The cam member 16 which is associated with hinge member 6 at one side of a back rest projects beyond this hinge member, and this projecting end is provided with two opposite flat surfaces upon which a knob 22 which has a corresponding aperture is fitted and secured.

Hinge member 6, the outer edges 23 of which are bent over, consists of a segmentally shaped part 24 and of a relatively narrow arm 25 thereon. Part 24 has two enlarged curved portions 26 and 27 which have a different radius of curvature. At the center of the curved portion 26 the bearing member 7 is mounted, while at the center of the other curved portion 27 an elongated aperture 28 is provided, as shown in FIGURE 3, which serves as a bearing for cam member 16.

In order to prevent the back rest from pivoting by itself, the curved portion 27 has a spring-supporting plate 29 secured thereto on which a spring 30 is mounted, one substantially semicircular bent portion 31 of which surrounds one cam 18 of cam member 16, while the arcuate edge 32 of plate 29 and portion 31 of spring 30 are shaped in accordance with the bent-over edge 23 of the curved position 27 of hinge member 6. The tension of the curved portion 31 of spring 30 around cam 18 of cam member 16 also produces a pressure thereon in the direction toward bearing member 7. In place of the clamping spring 30, as shown in FIGURE 3, it is also possible to provide a different kind of spring, for example, a simple tension or compression spring.

Between each hinge member 5 for the seat and hinge member 6 for the back rest a spacing disk 34 is provided through the bore of which the bearing member 7 extends and which is provided with three cranked projections 33 which are disposed at an angle of 60° relative to each other.

By means of shaft 6 which may be turned by knob 22 it is possible to adjust the back rest to any desired inclination relative to hinge member 5 which is secured to the frame of the seat so that its lower side extends substantially horizontally. Driving pins 13 which project from the ends 10 of shaft 9 and engage with the teeth of gear segments 8 and 8' will then permit a very fine adjustment of the back rest. When hinge member 6 on the back rest is pivoted to its lowest position, the seat and back rest together will extend in a substantially straight direction and may then serve as a berth.

Cam plates 17 which are mounted on the ends 15 of driving pins 13 prevent an unintentional disengagement of the driving pins from the teeth of gear segments 8 by the engagement of cams 19 on the bent-over edges 23 of hinge members 6 and 6'. Cam plates 17 further prevent hinge members 6 and 6' and shaft 9 from shifting in the horizontal direction.

The three driving pins 13 are disposed relative to each other in a triangular formation and at an equal distance from the axis 12 of shaft 9. By the meshing engagement of two driving pins 13 with the teeth of gear segments 8, hinge members 6 and 6' and the back rest to which they are secured will be held in a very stable, locked position.

When knob 22 is turned, for example, in the clockwise direction from the position as illustrated, one driving pin 13 will roll off the closed adjacent tooth flank of the teeth of gear segment 8 and, after knob 22 is turned twice about an angle of 60°, this driving pin will again be in a stable position in which two adjacent driving pins 13 are in meshing engagement with the gear teeth.

The operator of the device will be able to turn knob 22 about an angle of about 120° with one hand. This would, however, not be possible if only two driving pins were provided diametrically opposite to each other on each end of shaft 9, but in such a case the operator would have to use his other hand as well to adjust the back rest. If the ends of shaft 9 are provided with four or even more driving pins, the required angle of rotation of knob 22 may be even smaller. During the adjustment, shaft 9 must be slightly movable transverse to its longitudinal direction which is the reason why the elongated aperture 28 is provided. If cam member 16 is provided with three cams 18, this aperture 28 is preferably made of a length equal to the distance b between the line of connection of two driving pins 13 which are disposed vertically to each other and the central axis 12 of shaft 9 and of cam member 16, as shown in FIGURE 4.

The particular advantage of the device according to the invention resides in the very easy and very fine adjustability of the hinge members which are secured to the back rest, in the fact that the back rest will be automatically locked in any adjusted position, and in the fact that all special adjusting and locking means which are usually required in such devices are omitted.

Although the invention has been illustrated and described with reference to the preferred embodiments thereof, it may be understood that it is in no way limited to the details of such embodiments, but is capable of numerous modifications within the scope of the appended claims.

What is claimed is:

1. A device for adjusting the angular position of the back rest of a seat, especially of a motor vehicle, comprising two pairs of hinge members adapted to be secured to a seat and back rest at the opposite sides thereof, means for pivotably connecting the two hinge members of each pair to each other, a gear segment secured to one of said hinge members of each pair, a shaft connecting the other hinge member of one pair with the corresponding hinge member of the other pair, and a plurality of driving pins mounted on and extending within the periphery of said shaft, said driving pins being disposed concentrically about the axis of said shaft and parallel to the axis of said shaft near each end thereof, at least one of said driving pins being alternately in meshing engagement with the teeth of said gear segment, said two hinge members of each pair being automatically locked when at least two of said driving pins are in meshing engagement with said gear teeth.

2. A device for adjusting the angular position of the back rest of a seat, especially of a motor vehicle, comprising two pairs of hinge members adapted to be secured to a seat and back rest at the opposite sides thereof, means for pivotably connecting the two hinge members of each pair to each other, a gear segment secured to one of said hinge members of each pair, a tubular shaft connecting the other hinge member of one pair with the corresponding hinge member of the other pair, a plug member inserted into and secured to each end of said tubular shaft, and a plurality of driving pins secured to each of said plug members and extending within the periphery of said shaft and parallel to the axis of said shaft near each end thereof, at least one of said driving pins being alternately in meshing engagement with the teeth of said gear segment, said two hinge members of each pair being automatically locked when at least two of said driving pins are in meshing engagement with said gear teeth.

3. A device for adjusting the angular position of the back rest of a seat, especially of a motor vehicle, comprising two pairs of hinge members adapted to be secured to a seat and the back rest at the opposite sides thereof, means for pivotably connecting the two hinge members of each pair to each other, a gear segment secured to one of said hinge members of each pair, a shaft connecting the other hinge member of one pair with the corresponding hinge member of the other pair, a plurality of driving pins secured to and projecting from the two ends of said shaft within the periphery of said shaft and parallel to the axis of said shaft, a cam member mounted on the projecting ends of said driving pins on each end of said shaft, a spring engaging with each of said cam members, and a plate mounted on each of said cam members for guiding said spring and maintaining it on said cam member, at least one of said driving pins being alternately in meshing engagement with the teeth of said gear segment, said two hinge members of each pair being automatically locked when at least two of said driving pins are in meshing engagement with said gear teeth.

4. A device as defined in claim 3, further comprising a member for securing said plate to said cam member, said securing member being spaced from the end surface of said shaft at a distance slightly greater than the thickness of each of said gear teeth, each of said gear segments being secured to the hinge member of each pair adapted to be secured to a seat, said gear teeth being outwardly directed for engagement with said driving pins.

5. A device as defined in claim 3, in which said cam member and said plate have an equal number of cams thereon.

6. A device as defined in claim 5, in which said cams on said cam member and on said plate extend in the same direction.

7. A device as defined in claim 6, in which the number of said cams on said cam member and on said plate correspond to the number of said driving pins on each end of said shaft.

8. A device as defined in claim 3, further comprising a control knob mounted on said cam member on one end of said shaft.

9. A device as defined in claim 3, in which each of said hinge members adapted to be secured to a back rest comprises a substantially segmentally-shaped part and a relatively narrow arm integrally secured thereto, said segmentally-shaped part having an arcuate enlargement at each side thereof and an aperture in each of said enlargements substantially at the center of curvature thereof, said pivoting means of said hinge members comprising a bearing member mounted within one of said apertures, said other aperture being elongated and forming a bearing for said cam member.

10. A device as defined in claim 3, in which said hinge members adapted to be secured to a back rest have outer edges bent over in one direction, said bent-over edge of each of said hinge members surrounding said cam member and said spring.

11. A device as defined in claim 9, further comprising a plate mounted on one of said enlargements for securing and guiding said spring.

12. A device as defined in claim 11, in which said spring has a curved, substantially triangular shape, one substantially arcuately curved apex of said spring substantially semicircularly enclosing and gripping one of said cams of said cam member.

13. A device as defined in claim 10, in which said cams on said plate are alternately adapted to engage with and to be supported by the inner surface of said bent-over edge of said hinge member for said back rest.

References Cited in the file of this patent

UNITED STATES PATENTS

| Re. 24,528 | Borisch | Sept. 2, 1958 |
| 2,043,287 | Dorton | June 9, 1936 |